(12) United States Patent
Van Brocklin et al.

(10) Patent No.: US 7,397,217 B2
(45) Date of Patent: Jul. 8, 2008

(54) MEASURING FUEL BY COUNTING COULOMBS

(75) Inventors: Andy Van Brocklin, Corvallis, OR (US); Andrew Koll, Albany, OR (US); Makarand Gore, Corvallis, OR (US); Shane Shivji, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 598 days.

(21) Appl. No.: 10/664,269

(22) Filed: Sep. 17, 2003

(65) Prior Publication Data
US 2005/0058885 A1    Mar. 17, 2005

(51) Int. Cl.
*H01M 10/46*    (2006.01)

(52) U.S. Cl. .................. 320/101; 320/149

(58) Field of Classification Search ............... 320/101, 320/132, 149; 429/12, 24, 25
See application file for complete search history.

(56) References Cited

U.S. PATENT DOCUMENTS

| | | | |
|---|---|---|---|
| 2003/0110841 A1* | 6/2003 | Zhang et al. | 73/61.76 |
| 2003/0190500 A1* | 10/2003 | Smedley et al. | 429/12 |
| 2003/0224224 A1* | 12/2003 | Okada et al. | |
| 2004/0072041 A1* | 4/2004 | Koschany | 429/23 |
| 2004/0217652 A1* | 11/2004 | Bitoh | |
| 2004/0219398 A1* | 11/2004 | Calhoon | 429/13 |

* cited by examiner

*Primary Examiner*—Edward Tso (57) ABSTRACT

Subject matter includes an electric charge counting fuel gauge that displays an amount of fuel based on electric charges obtained from a fuel. The electric charge counting fuel gauge can display an amount of fuel used in a power source and the amount of fuel remaining in a fuel supply.

35 Claims, 8 Drawing Sheets

MEASURING FUEL BY COUNTING COULOMBS

TECHNICAL FIELD

This invention relates generally to electrical power systems, and more particularly to a charge counting fuel gauge.

BACKGROUND

There are many types of power supply systems that convert fuel to electricity, for example, coal-fired power plants, portable home generators driven by gasoline combustion engines, automobile alternators, and fuel cells. In these power supply systems, it is important to know the amount of fuel used or the amount remaining during operation.

Fuel cells, for example, energize an increasing number of applications due to their improving efficiency and portability. Miniaturized fuel cells are often used in applications once reserved exclusively for batteries. Advances such as solid oxide electrolytes and highly specialized electrodes have allowed fuel cells to become plausible energy sources in both miniature and large-scale applications.

Fuel cells have the advantage of being able to perform non-stop power production, at least theoretically, given an endless supply of fuel. Batteries, even rechargeable batteries, eventually lose their charge and must be refreshed. Recharging a battery costs not only power, which is usually merely stored in the battery, but also time, as few batteries can be recharged instantaneously.

Gauges to indicate the remaining power in a battery are known, for example, in automotive applications that often include a voltage meter that measures, at least indirectly, whether a car battery is remaining operational. Dry cells for flashlights and home electronics also commonly include a built-in freshness indicator that approximates the amount of remaining power by displaying a color code or a bar graph of a voltage level.

In contrast to batteries, fuel consuming power supply systems connected to a limited supply of fuel, e.g., a tank, typically have no appreciable decrease in output voltage to indicate the amount of fuel used or left in the tank. For example, a fuel cell's voltage is fairly constant until the very end of the fuel supply. Thus, known methods for indicating fuel supply in these fuel consuming systems are typically mechanical. Tanks of liquid and gaseous (or liquefied gas) fuels typically rely on mechanical liquid level and gas pressure sensors, often combined with tank position sensors to compensate for tank tilting. Float-based fuel level sensors, for example, are not very accurate, are sensitive to tank position or "attitude," and are relatively expensive. Magnetic induction fuel level sensors are inaccurate and also somewhat sensitive to tank attitude. Weight-based sensing of remaining fuel in a supply using a "scale" is expensive and bulky.

These mechanical methods work for relatively large applications, such as automotive fuel tanks although the mechanical sensing parts add cost to the tanks. For a miniature power supplies, e.g., tiny fuel cells, the mechanical sensing means become more cumbersome. For an electronic chip-sized fuel cell, it may not be practical to include a pressure gauge or level sensor.

Fuel Cell Power Supply Systems

A power supply system used for description purposes herein may be a fuel cell or an array of fuel cells. Each fuel cell may be a solid oxide fuel cell (SOFC), a proton conducting ceramic fuel cell, an alkaline fuel cell, a polymer electrolyte membranes (PEM) fuel cell, a molten carbonate fuel cell, a solid acid fuel cell, or a direct methanol PEM fuel cell.

The electrolyte of the fuel cell may be formed from any suitable electrolytic material. Various exemplary electrolytes include oxygen anion conducting membrane electrolytes, proton conducting electrolytes, carbonate ($CO_3^{2-}$) conducting electrolytes, $OH^-$ conducting electrolytes, and mixtures thereof.

Other exemplary electrolytes include cubic fluorite structure electrolytes, doped cubic fluorite electrolytes, proton-exchange polymer electrolytes, proton-exchange ceramic electrolytes, and mixtures thereof. Further, an exemplary electrolyte can also be yttria-stabilized zirconia, samarium doped-ceria, gadolinium doped-ceria, $La_aSr_bGa_cMg_dO_{3-\partial}$, and mixtures thereof, which may be particularly suited for use in solid oxide fuel cells.

The anode and cathode may be formed from any suitable material, such as nickel or lanthanum chromate, as desired and/or necessitated by a particular end use. Various exemplary anodes and/or cathodes can be metal(s), ceramic(s) and/or cermet(s). Some non-limitative examples of metals which may be suitable for the exemplary anode include at least one of nickel, platinum and mixtures thereof. Some non-limitative examples of ceramics which may be suitable for an anode include at least one of $Ce_xSm_yO_{2-\partial}$, $Ce_xGd_yO_{2-\partial}$, $La_xSr_yCr_zO_{3-\partial}$ mixtures thereof. Some non-limitative examples of cermets which may be suitable for an anode include at least one of Ni-YSZ, Cu-YSZ, Ni-SDC, Ni-GDC, Cu-SDC, Cu-GDC, and mixtures thereof.

Some non-limitative examples of metals which may be suitable for a cathode include at least one of silver, platinum and mixtures thereof. Some non-limitative examples of ceramics which may be suitable for a cathode include at least one of $Sm_xSr_yCoO_{3-\partial}$, $Ba_xLa_yCoO_{3-\partial}$, $Gd_xSr_yCoO_{3-\partial}$.

DETAILED DESCRIPTION

Some power supply systems generate electrical power from a fuel supply. An exemplary fuel gauge or meter ("gauge") and related methods are described herein for measuring fuel use and a remaining fuel supply in such power systems. In one implementation, the power supply system is of the fuel cell type.

Electric charge counting, e.g., coulomb counting ("charge counting"), is used to measure a total number of electric charges originating from a power supply system. The charge count can be correlated to molecules of fuel consumed, regardless of the rate of power production and the physical state of the fuel. The exemplary electric charge counting fuel gauge (CCFG) and related methods described herein not only indicate the amount of consumed fuel or remaining fuel (herein, "fuel level") but also the estimated remaining operating time. An exemplary CCFG does not usually have to come in contact with the fuel or the fuel container, since the exemplary measurements are electronic.

A coulomb (symbolized C) is a standard unit of electric charge in the "SI" International System of Units. It is a dimensionless quantity, similar to measures such as "dozen" or "mole," although "coulomb" usually refers to electronic charges, specifically $6.24 \times 10^{18}$ times the negative charge of an electron or the same number times the positive charge of a proton. In terms of SI base units, the coulomb is an amount of charge that can supply one amp of current for one second (one coulomb=one amp-second=0.28 milliamp-hours). Rearranging this relationship, an electric current of one amp represents one coulomb of electronic charge carriers flowing past a specific point in an electrical conductor in one second (one amp=one coulomb/sec).

By counting coulombs of charges proceeding from molecules of fuel that undergo oxidation in a power supply system, the subject matter may be used to create an exemplary CCFG that is often more accurate than known methods of estimating a fuel level. The subject matter is especially suitable for fuel cell power systems. An exemplary CCFG made according to the subject matter can be relatively lightweight and inexpensive because it is based mostly or fully on electronic parts that measure electronic quantities instead of mechanical sensing parts that measure non-electronic physical quantities. The exemplary CCFG does not have to come in contact with the fuel. The subject matter inherently avoids many pitfalls of conventional fuel measuring techniques because the number of electric charges provided by a molecule of a given type of fuel is usually stable and in some implementations the exemplary CCFG can be calibrated for imperfect conversion of fuel to power in many systems.

The subject matter can be conveniently implemented because electrical parameters in a power supply system are often already being measured so that the subject matter can sometimes use components already in place in a power system design. Unlike indicators that show the amount of energy left in a battery, the subject matter is not necessarily affected by the rate that charge is produced. A heavy load or the rapid discharge of a battery yields a deceptive indication because the rapidity of the discharge characteristically changes the efficiency of the battery. The battery may appear dead after a rapid discharge, but then recover after a rest.

Figure 1:
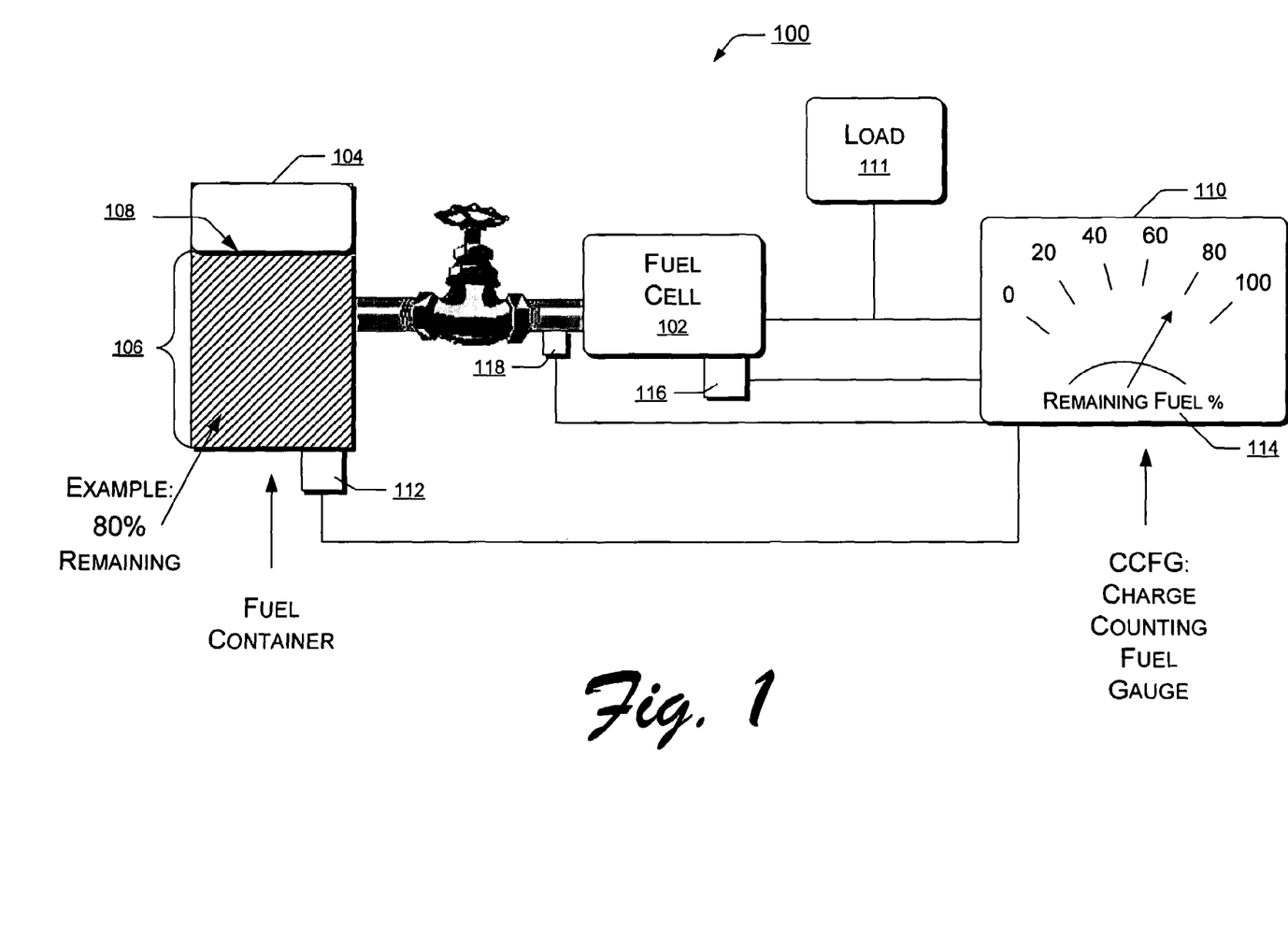
FIG. 1 is a block diagram of an exemplary charge counting fuel gauge in an exemplary fuel cell power system.

FIG. 1 shows an exemplary fuel cell power system 100 including the exemplary CCFG 110. The fuel cell 102 is at least one cell, battery, magneto, generator, thermocouple, piezoelectric crystal, etc. that can produce electric charges directly or indirectly from a fuel. Accordingly, the fuel cell 102 is connected to a fuel source, such as a fuel container 104 that holds a "remaining fuel amount" 106, also referred to herein as a "fuel level." Fuel gases such as hydrogen, methane, ethane, butane, propane, natural gas, etc., may be in gaseous form in the fuel container 104 or may be liquefied if the fuel container 104 is a pressure vessel. Instead of fuel gases, the fuel container 104 may store liquid fuels such as methanol, gasoline, etc., or liquefied fuel gases. A fuel level meniscus 108 may be apparent and measurable if the fuel container 104 has a fixed position and the remaining fuel amount 106 is in a different phase than a gas occupying the "empty" part of the fuel container 104. A dependable fuel level meniscus 108 for measuring a fuel level may be hard to obtain as many fuel containers 104 are portable and the remaining liquid amount 106 is free to move around the fuel container 104. At any given instant, it is probable at any given instant, that the remaining fuel amount 106 will be at the "top" of the fuel container instead of at the bottom, for example, when a car carrying the fuel container 104 drives over a bump or when if the fuel container 104 powers a portable device in a suitcase and experiences a force to the upside when the suitcase is moved. In these cases, the fuel level meniscus 108 may not be a good indicator of the remaining fuel amount 106.

If the fuel container 104 holds a pressurized and/or liquefied gas, a pressure-type fuel sensor may try to measure the remaining fuel amount 106. This method of fuel level measurement may be crudely satisfactory if the temperature of the fuel container 104 is taken into account, e.g., if the fuel container 104 is always at a fairly constant temperature. However, a liquefied gas may exert a fairly constant pressure until the fuel container 104 is virtually empty, providing a not-very-linear and not-very-useful indication of the remaining fuel amount 106. For a miniaturized fuel cell 102 with a miniature fuel container 104, the pressure-sensor technique may not be very useful as the small devices are apt to be vulnerable to temperature fluctuation and miniaturized pressure sensors may be expensive or impractical.

The exemplary CCFG 110 is electrically coupled with the fuel cell 102, typically across a resistor (not shown in FIG. 1) coupled in series with an electrical load 111. The exemplary CCFG 110 effectively counts molecules of fuel leaving the fuel container 104 by counting the electrons each molecule of fuel provides to the electric charge producing activity of the fuel cell 102. In one implementation, once calibrated to characteristics of the fuel cell 102, the exemplary CCFG 110 displays accurate representations of the remaining fuel amount 106 regardless of the physical position, weight, temperature, pressure, etc., of the remaining fuel in the fuel container 104.

In one implementation, a refill of the fuel container 104 is monitored using a refill sensor 112 that indicates to the exemplary CCFG 110 when the display of the remaining fuel percentage 114 should be reset to a higher number. In another implementation, the same refill sensor 112 or an additional sensor, indicates when a low or expended fuel container 104 is swapped with a full fuel container 104, e.g., using a microswitch to sense the tank swap.

Depending on the type of fuel cell 102 used in the exemplary fuel cell power system 100, an optional temperature sensor 116 may be employed to measure a temperature of at least a part of the fuel cell 102, if temperature variation affects the production of electric charges from the fuel. A temperature sensor 116 is already included as standard equipment in many types of fuel cells and sometimes regarded as a necessary item for effectively running the fuel cell.

An optional pressure sensor 118 may also be used to sense a pressure in the fuel container 104 or fuel supply line. In one implementation, the optional pressure sensor 118 senses an empty condition of the fuel container 104. The pressure sensor 118 can also be used to apply a compensation factor to the exemplary CCFG 110 to allow for fuel crossover (fuel leakage through the membrane or other means). The pressure sensor 118 can also be used to apply temperature compensation factor.

Figure 2:
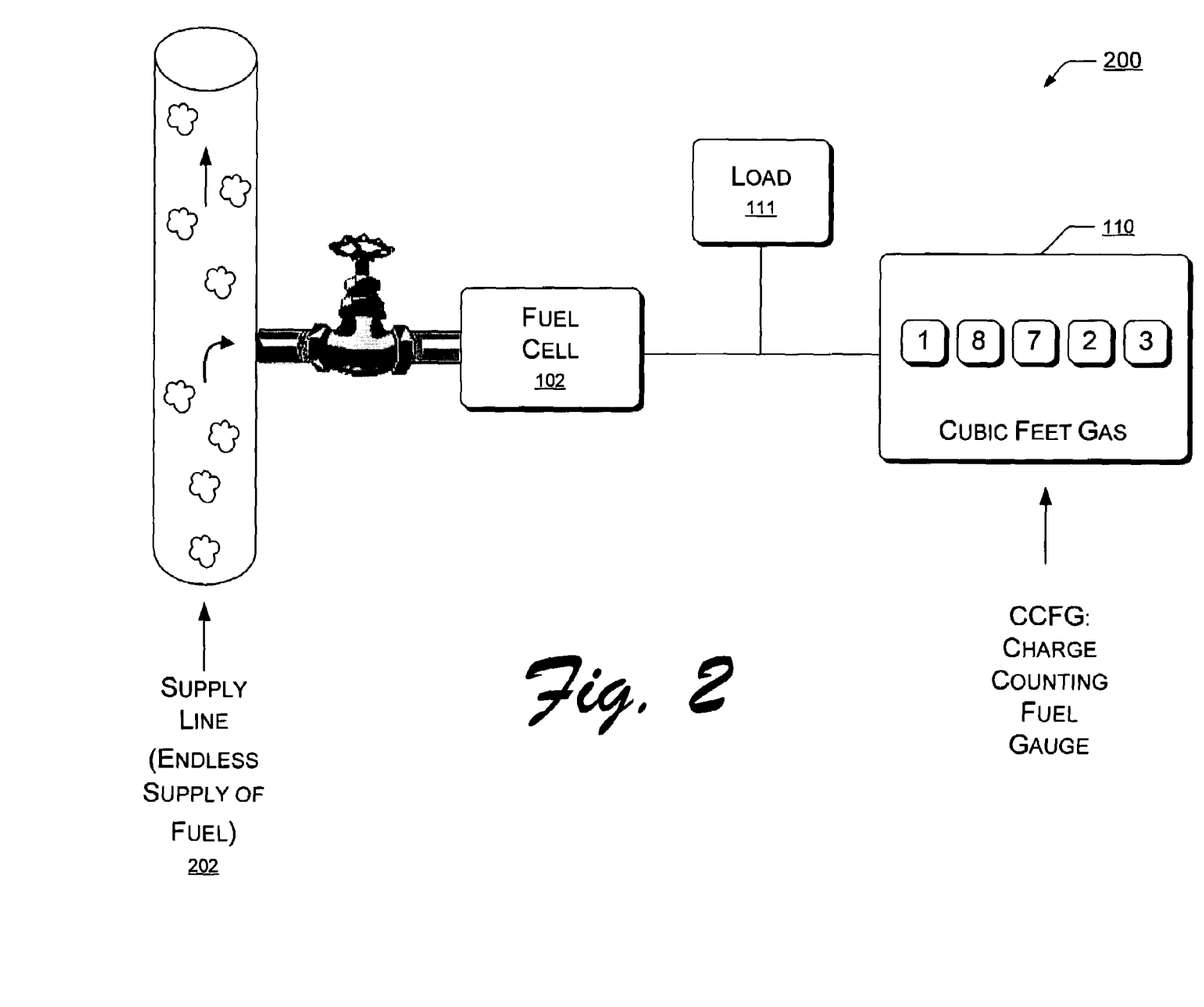
FIG. 2 is a block diagram of an exemplary charge counting fuel gauge, used as a meter, in another exemplary fuel cell power system.

FIG. 2 shows another exemplary power system 200 in which a supply line 202 provides the fuel cell 102 with an endless supply of fuel. In this implementation, the exemplary CCFG 110 does not display a remaining fuel amount 106 but instead displays an amount of fuel consumed. Hence, the exemplary CCFG 110 operates as a meter, which may be provided with reset circuitry. When configured as a meter, the exemplary CCFG 110 usually displays a number that increases but does not decrease until reset.

Figure 3:
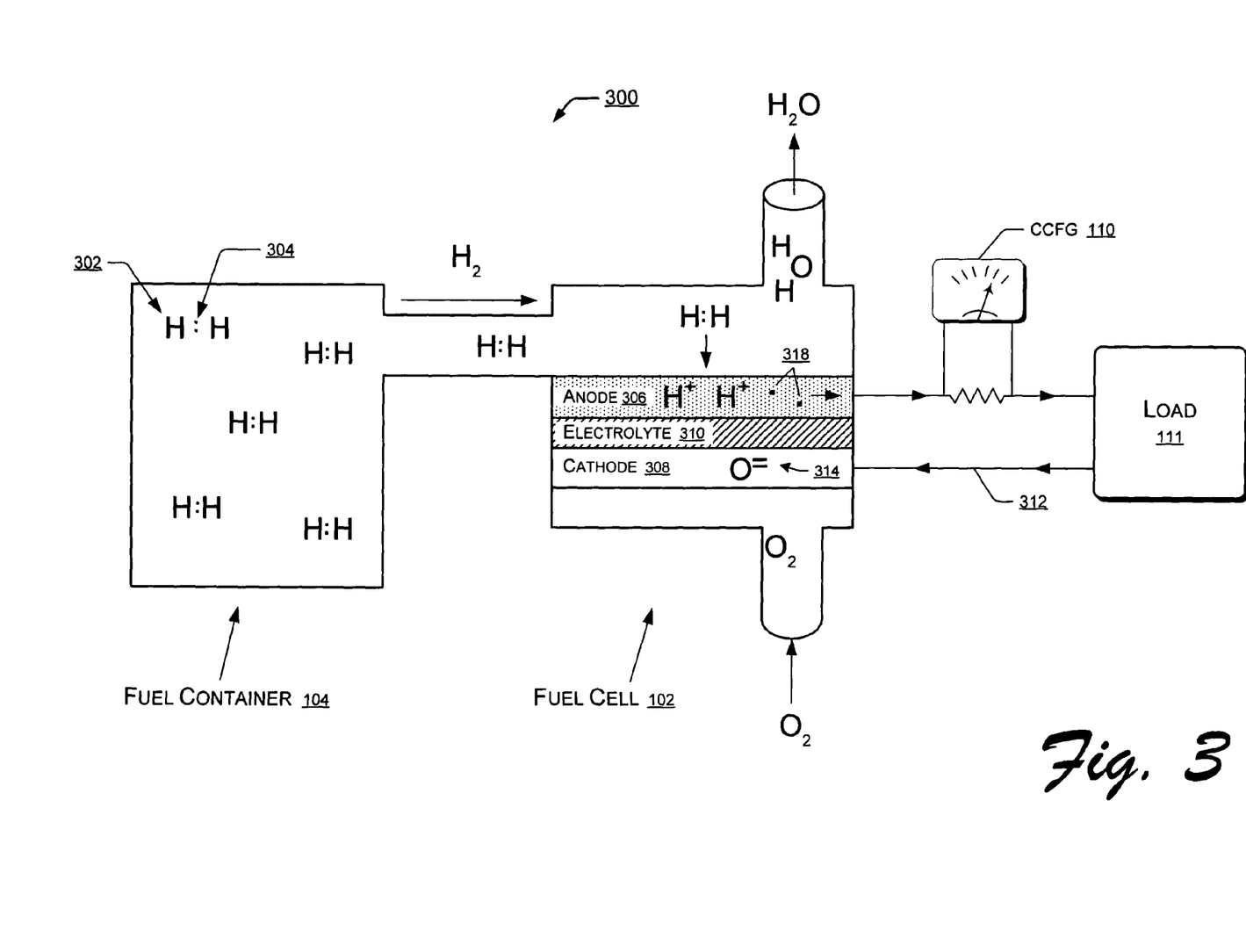
FIG. 3 is a block diagram of an exemplary charge counting fuel gauge in an exemplary fuel cell power system.

FIG. 3 shows a molecular view of fuel in an exemplary fuel cell power system 300. Hydrogen gas ($H_2$), comprised of $H_2$ molecules 302, each having two potentially available electrons 304, is selected as an exemplary fuel for describing charge counting in the context of the exemplary CCFG 110.

The electron flow for charge counting originates in the electrochemical reaction(s) of the fuel cell 102, that is, electrons are stripped off fuel molecules at the anode 306 in an electrochemical half-reaction. How and where the other (complementary) electrochemical half-reaction occurs depends on the type of fuel cell 102 used and more specifically depends on the type(s) of electrodes, type of electrolyte 310, and type of fuel employed (conventional materials for an anode 306 and a cathode 308 are discussed above in the Background section). In fuel cell types wherein the positively charged fuel ions carry positive charges across the electrolyte 310 (e.g., positively charged hydrogen ions in a proton exchange membrane type fuel cell using hydrogen gas as a fuel), the positively charged fuel (hydrogen) ions are reduced at the cathode 308 forming electrically neutral species such as water and carbon dioxide.

In fuel cell types wherein negatively charged ions are the charge carriers across the electrolyte 310 (e.g., negatively charged oxygen ions 314 in a solid oxide type fuel cell; negatively charged hydroxyl ions in an alkali type fuel cell; negatively charged carbon trioxide ions in a molten carbonate type fuel cell, etc.) the positively charged fuel ions are reduced at the anode 306 forming electrically neutral water and carbon dioxide. Thus depending on the type of fuel cell 102, reaction (waste) by-products can be expected on either the anode side or the cathode side of the fuel cell 102. In either case, free electrons 318 are "left over" at the anode 306 as reaction products. These free electrons 318 are the source of the electric current produced by the fuel cell 102 and can flow in an external electrical circuit 312.

Charge counting as a way of measuring fuel used or fuel remaining can be implemented by mathematically integrating flow of the electrical current ("current") originated as described above, with respect to flow of time. Amperage (the current) can be expressed in units of coulombs per second. One coulomb per second is equal to one ampere ("amp"). A current draw on the fuel cell 102 of 0.5 amps times 5 seconds, for example, is equal to 2.5 coulombs of charge. As mentioned, each coulomb of charge results from the flow of $6.24 \times 10^{18}$ electrons. For a fuel cell using hydrogen as the fuel, each $H_2$ molecule 302 contributes two electrons 304 as illustrated in FIG. 3. Hence, one measured coulomb of charge requires $(\frac{1}{2})(6.24 \times 10^{18})$ $H_2$ molecules 302 to be consumed in the fuel cell 102 under ideal conditions wherein every $H_2$ molecule 302 fuel contributes its two electrons toward the measurement. In less than ideal conditions, more $H_2$ molecules 302 may be needed to produce a measurement of one coulomb of charge.

One mole of $H_2$ gas has a mass of two grams (2 g) and occupies a volume of 22.4 liters at standard temperature and pressure (STP) conditions. A mole consists of $6.022 \times 10^{23}$ molecules. So one mole of $H_2$ gas at STP produces $(2 \times (6.022 \times 10^{23})/(6.24 \times 10^{18}))=193,000$ coulombs of charge.

When multiple cells are stacked in series to obtain higher voltages, an $H_2$ molecule 302 contributing two electrons is consumed at each cell to produce the desired voltage. Thus, in a twenty cell stack, such as that used to power notebook computers, one gram of $H_2$ fuel yields a measurement of $193,000/(2 \times 20)=4,800$ coulombs. The divisor "2" is used because 1 gram of $H_2$ gas is one-half of a mole of $H_2$ gas. If the one gram of $H_2$ fuel is used in 1 hour, a current of (4,800 coulombs per hour)/(3600 seconds in an hour)=1.3 amps results. If a typical cell operates at 0.4 volts, then (1.3 amps×0.4 volts×20 cells)=10.4 watts of power. Over one hour, one gram of $H_2$ fuel would give 10.4 watt-hours of energy.

Thus, by integrating the electric current from the fuel cell 102 with respect to time the amount of fuel consumed by the exemplary fuel cell power system 100 can be calculated. For example, when 2,400 coulombs are measured in the fuel cell having the twenty-cell stack described above, one-half gram of $H_2$ fuel has been consumed. In a fuel container 104 with a capacity of 2.5 grams $H_2$ fuel the consumption of half a gram of the $H_2$ fuel would be 20% of the capacity of the fuel container 104, leaving a remaining fuel amount 106 of 80%, which would be displayed by the exemplary CCFG 110. Or, knowing the weight of molecules of fuel consumed, the percentage of fuel used can be determined by gas laws from the volume of the fuel container 104 and the pressure the fuel container 104 is maintained at.

Charge counting, e.g., of coulombs, can measure a fuel level because of the small integer ratio relationship between molecules of fuel and their freed electrons, which are counted. Alternatively, fuel usage could also be calculated by multiplying the overall voltage of a power supply system by the system's overall current to obtain the "power" (volts multiplied by amps) of the system and then integrating this power over time to get energy. This alternative method may require more knowledge about the system in order to provide an accurate fuel gauge. Specifically, an efficiency curve of the power supply system for various power outputs through a particular connected electrical load would be needed. Getting an efficiency curve or factor that is accurate enough might be troublesome. The technique of counting charges can be easier to implement because the charges correspond proportionally to molecules of fuel reacted.

Figure 4:
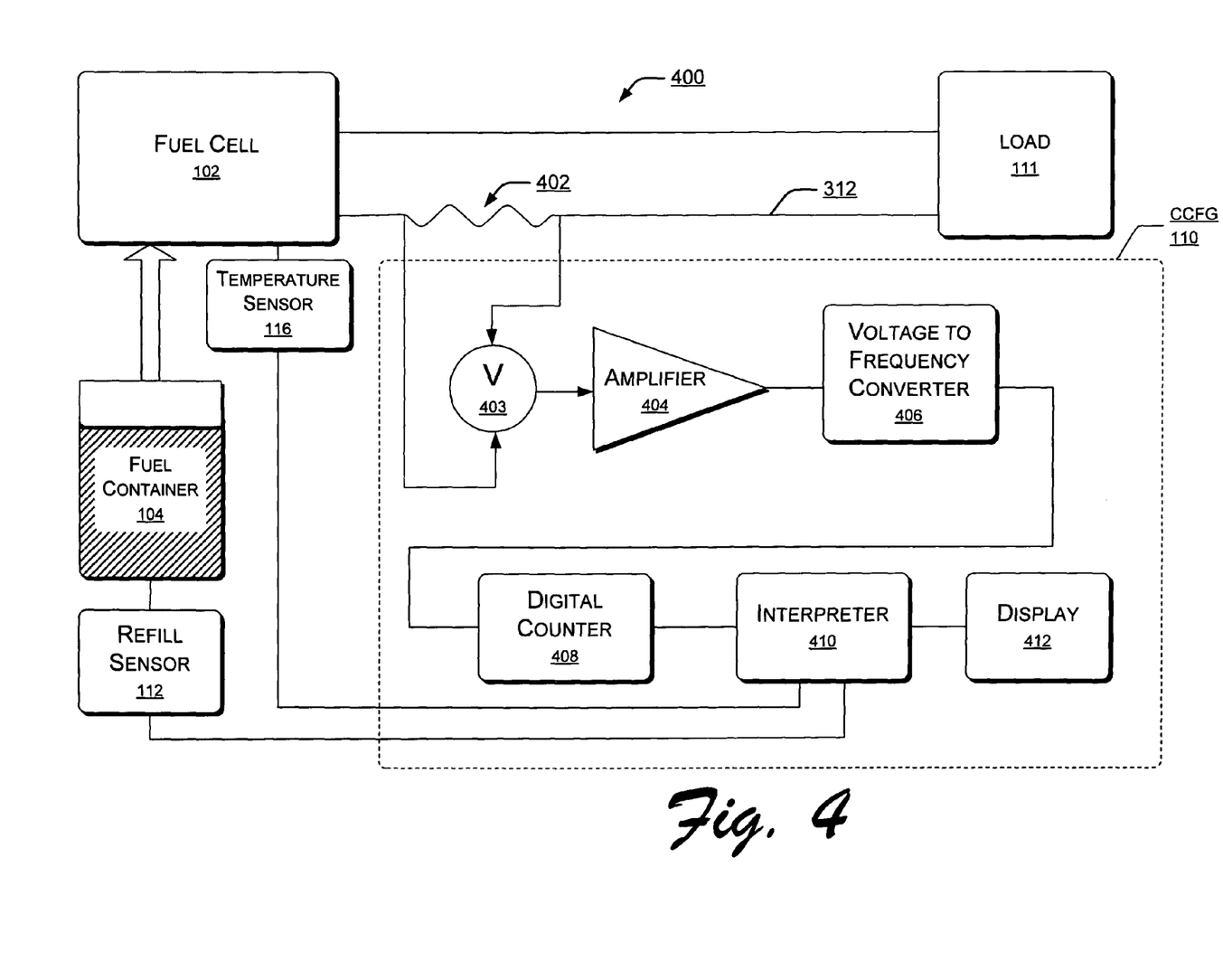
FIG. 4 is a block diagram of an exemplary charge counting fuel gauge in greater detail in the context of an exemplary fuel cell power system.

FIG. 4 shows an exemplary fuel cell power system 400, including one implementation of the exemplary CCFG 110 in greater detail.

In this implementation, a series resistor 402 (e.g., 0.02 ohms) is connected in the electrical circuit 312 of the fuel cell 102. The current flowing through the series resistor 402 is sensed by measuring a voltage 403 across the series resistor 402, which is proportional to the sensed current according to ohm's law. The instantaneous current flows thus measured are integrated (collected, summed, etc.) with respect to time, in one implementation, by amplifying the measured voltage via an amplifier 404 and sending the amplified voltage signal to a "voltage to frequency converter" 406 that drives a digital counter 408. Thus, a voltage proportional to the current at each instant is measured, this voltage is converted to a frequency, and the number of frequency oscillations is counted. The count represents the number of electric charges, e.g., in coulombs, contributed by molecules of fuel.

The digital counter 408 produces an electric charge count, as described above, but in some implementations the charge count may need interpretation. An exemplary interpreter 410 receives the charge count and may perform one or more corrections, calibrations, compensations, conversions, normalizations, standardizations, comparisons, etc., on the charge count. Besides interpreting the charge count, the exemplary interpreter 410 can convert the charge count to units suitable for a display 412. For example, if the gauge display 412 shows the remaining fuel amount 106 as a percentage, then the exemplary interpreter 410 performs a calculation to convert the charge count into a percentage. An exemplary interpreter 410 will be discussed in greater detail below with respect to FIG. 5.

A commercially available integrated circuit, such as the BQ2092 IC that includes a coulomb counter, can be adapted for use as at least part of the electric charge counting aspect of the subject matter (Benchmark Electronics, Inc., Angleton Tex.). Output from the coulomb counting part of the BQ2092 IC could be fed to the exemplary interpreter 410.

Figure 5:
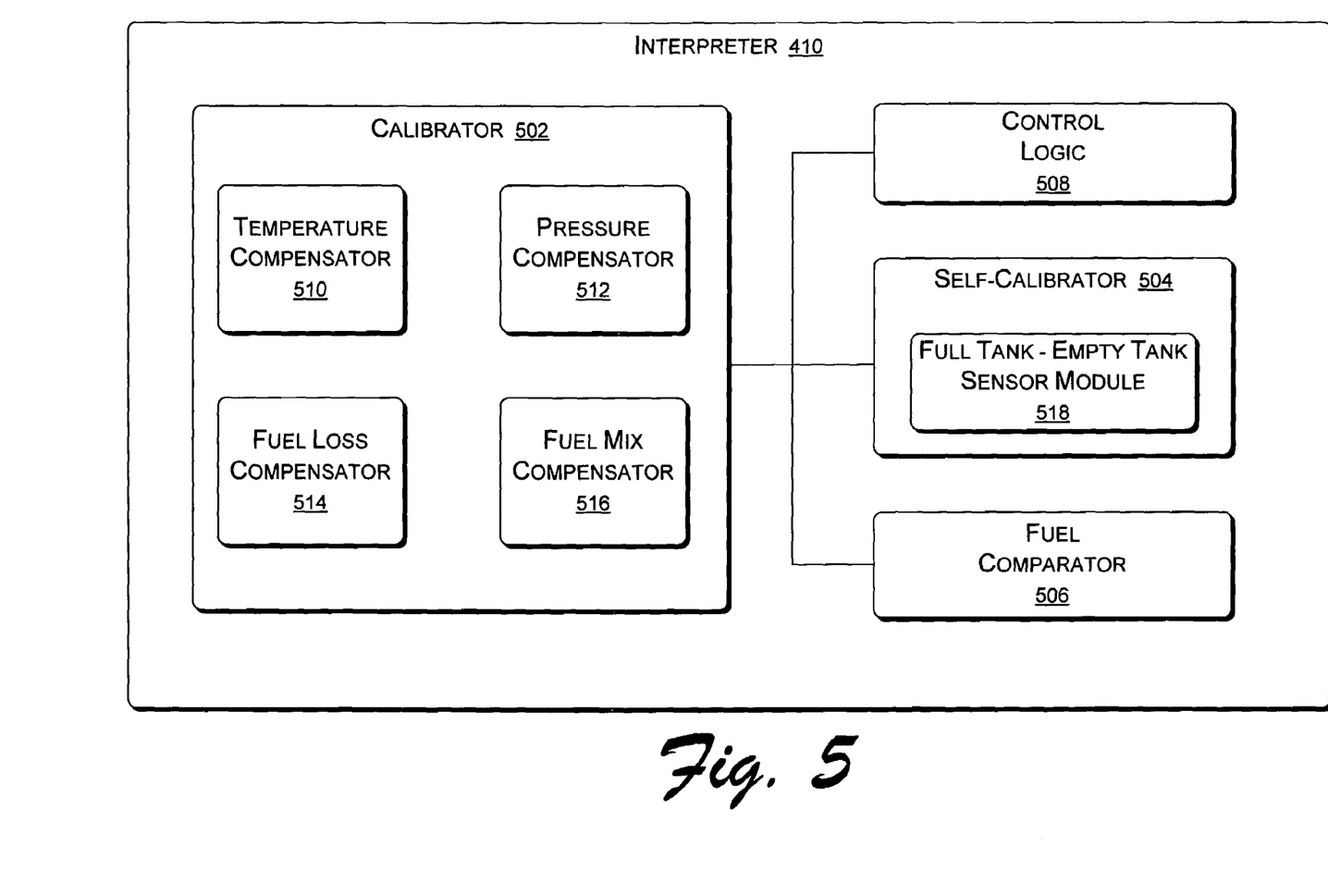
FIG. 5 is a block diagram of an exemplary interpreter module of an exemplary charge counting fuel gauge.

As shown in FIG. 5, an exemplary interpreter 410 may include a calibrator 502, a self-calibrator 504, and a "fuel" comparator 506 communicatively coupled with control logic 508 as illustrated. The calibrator 502 may further include a temperature compensator 510, a pressure compensator 512, a fuel loss compensator 514, and a fuel mix compensator 516, as illustrated. The self-calibrator 504 may further include other components, such as a full tank-empty tank sensor module 518 or volumetric measuring devices for determining an increment of fuel used. The exemplary interpreter 410 may contain more or fewer components, those illustrated are only example interpreter components that could be used.

The fuel loss compensator 514 can compensate for fuel that leaves the fuel container 104 without contributing to the charge count. This compensation can be performed during runtime, wherein the fuel loss compensator 514 gathers input and calculates a compensation factor, or the compensation can be predetermined, for example via settings placed at the factory or entered by a user. For example, the power supply system may come with a chart that shows settings to enter for various fuels used.

One type of fuel loss in the exemplary fuel cell system 300, for example, may be "crossover", in which fuel from the anode side of the fuel cell 102 travels around a fuel cell chamber to the cathode side without undergoing oxidation, thereby "wasting" the fuel. Crossover may be especially evident in single chamber fuel cells, for instance, wherein fuel and oxidizer are mixed together at the outset. Sometimes fuel may simply diffuse into the anode 306, and then diffuse out of the anode 306 without undergoing an electrochemical reaction.

Another form of quiescent fuel loss that may be compensated for by the fuel loss compensator 514 is leakage through porous electrode and/or electrolyte elements (e.g., 306, 308, 310). Some fuels are fed into a fuel cell power system under slight pressure, and there may be some constant rate of fuel leakage even when the fuel cell power system is not producing power. Many fuel cells 102 have a pressure regulator that produces a constant pressure of fuel gas on the anode side of an anode-electrolyte-cathode membrane. On the cathode side of the membrane, there is typically air at atmospheric pressure. The membrane is permeable to the fuel gas even when not producing electricity. A calibration performed by the fuel loss compensator 514 can filter out this fuel loss and add a temperature compensation as well if the fuel loss rate depends on the temperature of the membrane.

The temperature compensator 510 and/or the pressure compensator 512 may adjust a calculation and/or a displayed remaining fuel amount 106 for variances in temperature and/or pressure or, temperature and pressure considerations may be used in other calibrations and compensations, such as those carried out by the fuel loss compensator 514 and/or the fuel mix compensator 516.

Yet another fuel irregularity that may be compensated for by the fuel loss compensator 514 is reformation of the fuel. Some fuels, for instance, some of the hydrocarbons, may form reaction products that can be reacted with each other or with a catalyst in the fuel cell 102 to make the same or other kinds of fuel. This may result in a "negative" fuel loss. The fuel loss compensator 514 can adjust for this fuel reformation, either by allowing a compensation factor to be entered, or by determining a compensation factor by trial-and-error, e.g., with the help of the temperature sensor 116, the pressure sensor 118 and/or the self-calibrator 504.

The fuel mix compensator 516 can find a compensation factor between the charge count and the fuel level to be displayed if a mixed or diluted fuel is used. For example, if the fuel is propane diluted half-and-half with air, then a compensation factor may be entered or determined by trial and error, e.g., with help from the self-calibrator 504.

The self-calibrator 504 can receive input during fuel use to determine how to scale and display a fuel level. In one implementation, the self-calibrator 504 uses the full tank-empty tank sensor module 518 to sense a full condition and an empty condition of the fuel container 104. The self-calibrator 504 can compensate for multiple factors that introduce variance between a charge count and the fuel amount to be displayed by performing a trial during which the power system uses an increment of the fuel supply or runs from a full condition to an empty condition of the fuel container 104. For example, if the power system is a home generator powered by a "gasoline" internal combustion engine, and the home generator is usually used in a repeatable manner (e.g., same fuel, same load, etc.), then one implementation of the self-calibrator 504 might have a "reset" button and a "finished" button as sensors connected to the full tank-empty tank sensor module 518. The reset button can be pressed by the user or actuated by an automatic process when the gasoline tank is filled full. The generator is then used and the exemplary CCFG 110 counts the coulombs produced by a tank of fuel. When the fuel runs out, the user presses or an automatic process actuates the "finished" button. The exemplary CCFG 110 is then in possession of the total number of electric charges, e.g., coulombs, that can be produced by a tank of fuel in this particular system, and in subsequent uses the exemplary CCFG 110 can display a remaining amount of fuel 106 based on how many electric charges have been counted. Thus, should the home generator user switch from gasoline to methanol, or from 92% octane to 87% octane gasoline, the exemplary CCFG 110 can self-calibrate with input from the "reset" button and the "finished" button. Of course, these buttons may be replaced by automatic fuel level sensors, capacitance switches, etc., or by more sophisticated processing methods. For example, a fuel flow sensor attached to a fuel line may be controlled by a microprocessor and self-calibrate the exemplary CCFG 110 every few seconds, or every few milliseconds, by relating increments of fuel flow to coulombs counted.

In the case of a fuel cell power system, the self-calibrator 504 may utilize measurements from the temperature compensator 510, the pressure compensator 512, the fuel loss compensator 514, and the fuel mix compensator 516 in arriving at a calibration between charges counted and displayed fuel level. Knowledge of how a particular membrane in the fuel cell loses or crosses-over fuel may be available, and often measurements of temperature, pressure, and power generated can be used to scale the calibration. These calibrations can also be factory set as mentioned above depending on how precisely the power supply system is built and on how accurate of an exemplary CCFG 110 is needed. For instance, a manufacturer could incorporate calibration settings in the firm-ware of a controller, micro-processor, etc., controlling the charge counting.

The exemplary interpreter 410 may also optionally include a fuel comparator 506. The fuel comparator 506 determines a charge count for each given sample amount of different types of fuel. For example, for a particular fuel cell, the fuel comparator 506 may determine that methane yields more coulombs than an equivalent amount of hydrogen. In a gasoline system, for example, the fuel comparator 506 may compare the coulombs produced by a sample of gasoline to the coulombs produced by a sample of oxygenated gasoline. In one implementation, the samples needed could be very small, if the fuel comparator 506 has access to volumetric measuring means for small samples.

Exemplary Methods

Figure 6:
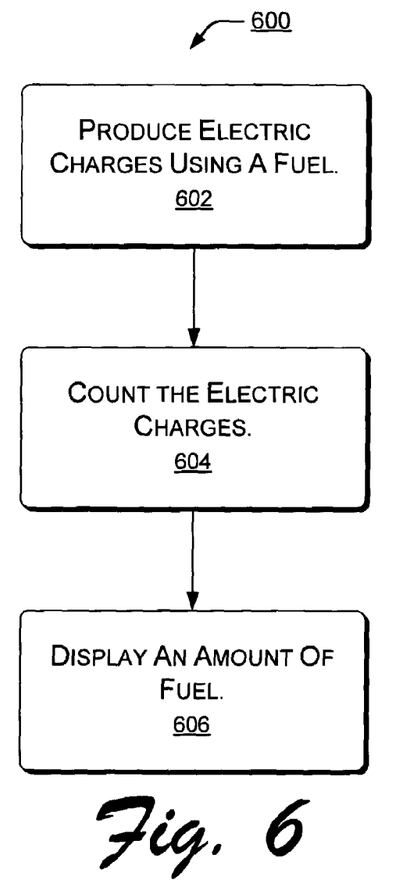
FIG. 6 is a flow diagram of an exemplary method of counting electric charges to display an amount of fuel.

FIG. 6 shows an exemplary method 600 of counting electric charges to display an amount of fuel. In the flow diagram, the operations are summarized in individual blocks.

At block 602, electric charges are produced using a fuel. A constant number of electric charges are usually produced for each molecule of fuel. The electric charges may be obtained from an oxidation reaction of the fuel, such as an electrochemical reduction-oxidation reaction that occurs in a fuel cell.

At block 604, the electric charges are counted.

At block 606, an amount of fuel is displayed. The amount can be fuel used or fuel remaining in a fuel supply.

Figure 7:
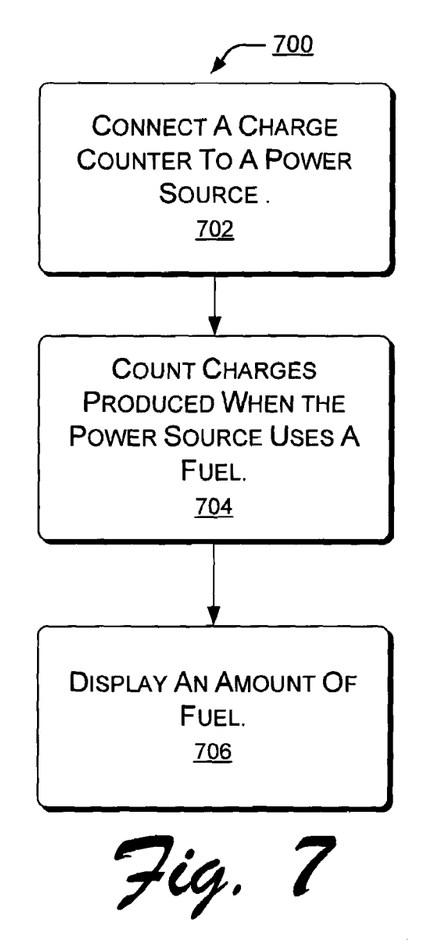
FIG. 7 is a flow diagram of an exemplary method of using an exemplary charge counting fuel gauge.

FIG. 7 shows an exemplary method of using an exemplary charge counting fuel gauge. In the flow diagram, the operations are summarized in individual blocks.

At block 702, a charge counter is connected to a power source.

At block 704, charges are counted when the power source uses a fuel.

At block 706, an amount of fuel is displayed. The method may include displaying an amount of fuel remaining in a fuel supply after an amount of fuel corresponding to the electric charges has been subtracted from the fuel supply.

The power source may be a fuel cell power source and the exemplary CCFG 110 may determine a proportionality factor between charges counted and an amount of fuel used by the fuel cell power source.

Experimental Results

Figure 8:
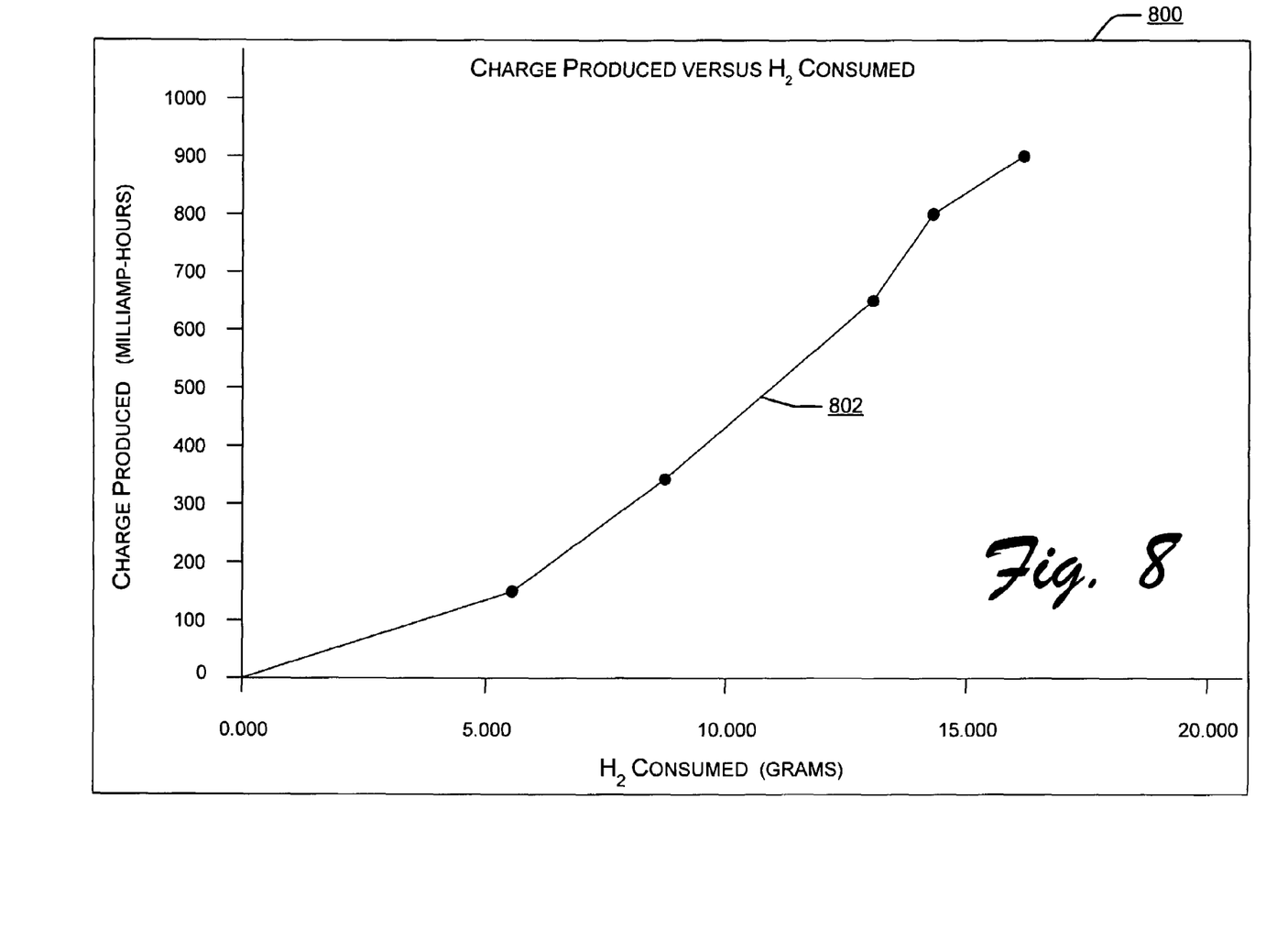
FIG. 8 is a graphic representation of an example plot of experimental results relating charge produced in a fuel cell to hydrogen fuel consumed by the fuel cell.

Table 1 below shows experimental results 800 for an exemplary CCFG 110. The hydrogen fuel consumed in a fuel cell 102 is related to the coulombs flowing over time through a point in the electrical circuit 312 of the fuel cell 102. The initial amount of hydrogen fuel was 20 grams.

As shown in FIG. 8, the resulting plot 802 of charge produced in milliamp-hours versus hydrogen consumed in grams is approximately linear allowing it to be used as the basis for the exemplary CCFG 110.

TABLE 1

| Time (secs.) | Coulombs Counted | $H_2$ Used (grams) | Charge Produced (milli-amp hours) | Remaining Fuel |
|---|---|---|---|---|
| 0 | 0.000 | 0.000 | 0.000 | 100% |
| 436 | 555.750 | 5.408 | 154.375 | 73% |
| 1050 | 1260.000 | 8.451 | 350.000 | 58% |
| 1956 | 2362.500 | 12.845 | 656.250 | 36% |

TABLE 1-continued

| Time (secs.) | Coulombs Counted | $H_2$ Used (grams) | Charge Produced (milli-amp hours) | Remaining Fuel |
|---|---|---|---|---|
| 2384 | 2907.000 | 14.366 | 807.500 | 28% |
| 2645 | 3240.000 | 15.887 | 900.000 | 21% |

CONCLUSION

The foregoing discussion describes an exemplary charge counting fuel gauge, and related methods. Although the invention has been described in language specific to structural features and/or methodological acts, it is to be understood that the subject matter defined in the appended claims is not necessarily limited to the specific features or acts described. Rather, the specific features and acts are disclosed as exemplary forms of implementing the claimed invention.

The invention claimed is:

1. An apparatus, comprising:
   a fuel cell for producing a flow of electric charges from a fuel;
   an electric charge counter coupled with the fuel cell, wherein counted electric charges are proportional to an amount of the fuel used in the fuel cell to produce the counted electric charges, wherein the electric charge counter:
   counts electric charges by integrating the flow of electric charges with respect to time;
   counts electric charges by measuring a voltage proportional to a flow rate of the electric charges and by assigning a frequency to the voltage;
   varies the frequency in proportion to changes in the flow rate of the electric charges over time; and
   increments the count of the electric charges at an incrementing rate proportional to the frequency; and
   a display coupled with the electric charge counter to show an amount of the fuel based on corresponding counted electric charges.

2. The apparatus as recited in claim 1, wherein the display shows an amount of fuel used by the fuel cell based on the counted electric charges.

3. The apparatus as recited in claim 1, further comprising a fuel supply, wherein the display shows an amount of fuel remaining in the fuel supply after subtracting the amount of fuel corresponding to the counted electric charges.

4. The apparatus as recited in claim 1, wherein the electric charge counter includes an interpreter to determine a proportionality factor between the counted electric charges and the amount of fuel used to produce the counted electric charges.

5. The apparatus as recited in claim 4, further comprising a temperature compensator, wherein the amount of fuel shown on the display is corrected for a temperature if the temperature affects the proportionality between the quantity of counted electric charges and the amount of fuel used to produce the counted electric charges.

6. The apparatus as recited in claim 4, further comprising a pressure compensator, wherein the amount of fuel shown on the display is corrected for a pressure if the pressure affects the proportionality between the quantity of counted electric charges and the amount of fuel used to produce the counted electric charges.

7. The apparatus as recited in claim 4, further comprising a fuel loss compensator, wherein the amount of fuel shown on the display is corrected if a fuel loss affects the proportionality between the quantity of counted electric charges and the amount of fuel used to produce the counted electric charges.

8. The apparatus as recited in claim 4, further comprising a fuel mix compensator, wherein the amount of fuel shown on the display is corrected if a fuel mix affects the proportionality between the quantity of counted electric charges and the amount of fuel used to produce the counted electric charges.

9. The apparatus as recited in claim 4, further comprising a self-calibrator to determine, while counting electric charges during fuel use, the proportionality between the counted electric charges and the amount of fuel used to produce the counted electric charges.

10. The apparatus as recited in claim 9, wherein the self-calibrator performs automatic determination of the proportionality.

11. The apparatus as recited in claim 4, further comprising a fuel comparator to determine electric charge counts for equivalent amounts of different types of fuel.

12. A fuel cell, comprising:
a means for convening a fuel into a flow of electric charges, wherein the quantity of electric charges produced over time is proportional to the quantity of fuel molecules converted;
a means for counting the electric charges in the flow, wherein:
the means for counting the electric charges integrates the flow of electric charges with respect to time;
the means for counting the electric charges measures a voltage proportional to the flow of the electric charges and assigns a frequency to the voltage;
the means for counting electric charge varies the frequency in proportion to changes in the flow rate of electric charges over time; and
the electric charge counter increments the count of the electric charges at an incrementing rate proportional to the frequency; and
a means for displaying an amount of fuel molecules converted.

13. The fuel cell as recited in claim 12, wherein the means for displaying shows the amount of fuel molecules converted as an amount of fuel from a fuel supply.

14. The fuel cell as recited in claim 13, wherein the means for displaying shows the amount of molecules convened as an amount of fuel remaining in a fuel supply.

15. The fuel cell as recited in claim 12, wherein the means for counting electric charges measures an overall power output of the fuel cell over time when connected to a particular electrical load and correlates the overall power output of the fuel cell over time to the quantity of fuel molecules converted using an efficiency factor of the fuel cell when connected to the particular electrical load.

16. The fuel cell as recited in claim 12, wherein the means for counting electric charges includes a means for determining a proportionality between the count of the electric charges and the quantity of fuel molecules converted.

17. The fuel cell as recited in claim 16, wherein the means for determining a proportionality further comprises a temperature compensator.

18. The fuel cell as recited in claim 16, wherein the means for determining a proportionality further comprises a pressure compensator.

19. The fuel cell as recited in claim 16, wherein the means for determining a proportionality further comprises a fuel loss compensator.

20. The fuel cell as recited in claim 16, wherein the means for determining a proportionality further comprises a fuel mix compensator.

21. The fuel cell as recited in claim 16, wherein the means for determining a proportionality further comprises a self calibrator to determine the proportionality while counting electric charges during fuel use.

22. The fuel cell as recited in claim 21, wherein the self-calibrator performs automatic determination of the proportionality.

23. The fuel cell as recited in claim 12, further including a is fuel comparator to determine electric charge counts from equivalent amounts of different types of fuel.

24. A fuel supply system, comprising:
a fuel container for holding a remaining amount of fuel;
an electric charge counter to count an electric charge content of an amount of fuel taken from the fuel container, wherein the count of the electric charge content is proportional to the amount of the fuel taken from the fuel container, wherein the electric charge counter:
counts electric charges by measuring a voltage proportional to a flow rate of the electric charges and by assigning a frequency to the voltage;
varies the frequency in proportion to changes in the flow rate of the electric charges over time; and
increments the count of the electric charges at an incrementing rate proportional to the frequency; and
a display to show the remaining amount of fuel in the fuel container.

25. The fuel supply system as recited in claim 24, wherein the electric charge content is counted during oxidation of the fuel by a fuel cell.

26. The fuel supply system as reeked in claim 24, wherein the fuel comprises fuel molecules, and each fuel molecule contributes a constant number of electric charges to the count of the electric charge content.

27. A fuel gauge, comprising:
a charge counter to count electrical charges produced in a fuel cell by a fuel from a fuel supply, wherein the electric charge counter:
counts electric charges by measuring a voltage proportional to a flow rate of the electric charges and by assigning a frequency to the voltage;
varies the frequency in proportion to changes in the flow rate of the electric charges over time; and
increments the count of the electric charges at an incrementing rate proportional to the frequency; and
a display to show an amount of the fuel based on the counted electrical charges.

28. The fuel gauge as recited in claim 27, wherein the amount of the fuel displayed is an amount of the fuel that has been used from the fuel supply.

29. The fuel gauge as recited in claim 27, wherein the amount is of the fuel displayed is an amount of the fuel remaining in the fuel supply.

30. A method, comprising:
producing electric charges in a fuel cell using a fuel;
counting the electric charges to determine an amount of the fuel used to produce the electric charges, wherein counting the electrical charges comprises:
measuring a voltage proportional to a flow rate of the electric charges and by assigning a frequency to the voltage;
varying the frequency in proportion to changes in the flow rate of the electric charges over time; and
incrementing the count of the electric charges at an incrementing rate proportional to the frequency; and
displaying the amount.

31. The method as recited in claim 30, wherein the producing is electric charges using a fuel includes producing a number of electric charges for each molecule of fuel, wherein the number is a constant.

32. The method as recited in claim 30, wherein the electric charges are obtained from an oxidation reaction of the fuel.

33. A method, comprising:
   connecting an electric charge counter to a fuel cell, wherein the fuel cell produces electric charges from a fuel;
   counting the electric charges, wherein counting the electrical charges comprises:
      measuring a voltage proportional to a flow rate of the electric charges and by assigning a frequency to the voltage;
      varying the frequency in proportion to changes in the flow rate of the electric charges over time; and
      incrementing the count of the electric charges at an incrementing rate proportional to the frequency; and
   displaying an amount of fuel corresponding to the counted electric charges.

34. The method as recited in claim 33, further comprising displaying an amount of fuel remaining in a fuel supply after an amount of fuel corresponding to the counted electric charges has been subtracted from the fuel supply.

35. The method as recited in claim 33, further comprising determining a proportionality factor between a quantity of the counted electric charges and an amount of fuel used by the fuel cell.

* * * * *

UNITED STATES PATENT AND TRADEMARK OFFICE
CERTIFICATE OF CORRECTION

PATENT NO. : 7,397,217 B2
APPLICATION NO. : 10/664269
DATED : July 8, 2008
INVENTOR(S) : Andy Van Brocklin et al.

It is certified that error appears in the above-identified patent and that said Letters Patent is hereby corrected as shown below:

In column 2, line 27, after "$La_xSr_yCr_zO_{3-\delta}$" insert -- , and --.

In column 11, line 20, in Claim 12, delete "convening" and insert -- converting --, therefor.

In column 11, line 43, in Claim 14, delete "convened" and insert -- converted --, therefor.

In column 12, lines 2-3, in Claim 21, delete "self calibrator" and insert -- self-calibrator --, therefor.

In column 12, line 9, in Claim 23, delete "is" before "fuel".

In column 12, line 31, in Claim 26, delete "reeked" and insert -- recited --, therefor.

In column 12, line 52, in Claim 29, after "amount" delete "is".

In column 13, line 2, in Claim 31, delete "is" before "electric".

Signed and Sealed this

Fourteenth Day of April, 2009

JOHN DOLL
*Acting Director of the United States Patent and Trademark Office*